US007202970B1

(12) United States Patent
Maher et al.

(10) Patent No.: US 7,202,970 B1
(45) Date of Patent: Apr. 10, 2007

(54) METHOD AND SYSTEM OF PRINTING IDENTIFICATION CARD (ID) USING AN INKJET PRINTER

(75) Inventors: Edward P. Maher, Oceanside, CA (US); Thomas J. Stark, Ramona, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 09/702,380

(22) Filed: Oct. 31, 2000

(51) Int. Cl.

| | |
|---|---|
| ***H04N 1/387*** | (2006.01) |
| ***G06K 15/02*** | (2006.01) |
| ***B41J 3/407*** | (2006.01) |
| ***B41J 2/01*** | (2006.01) |
| ***B42D 15/10*** | (2006.01) |

(52) U.S. Cl. ..................... 358/1.9; 358/1.18; 358/502; 283/75; 283/77; 283/94; 283/107; 283/109; 283/112; 347/3

(58) Field of Classification Search ................ 358/1.1, 358/1.3, 1.8, 1.12, 1.13, 1.17, 1.18, 1.5, 1.14, 358/1.15, 1.9, 502; 283/1.04, 105, 106, 107, 283/108, 109, 75, 77, 94, 110, 112; 347/4, 347/2, 3

See application file for complete search history.

(56) References Cited

U.S. PATENT DOCUMENTS

| | | | | |
|---|---|---|---|---|
| 4,769,694 | A * | 9/1988 | Oshikoshi | 358/540 |
| 4,882,621 | A * | 11/1989 | Suzuki et al. | 358/518 |
| 5,595,403 | A * | 1/1997 | Garrison | 283/74 |
| 6,241,332 | B1 * | 6/2001 | Cummins et al. | 347/4 |
| 6,264,296 | B1 * | 7/2001 | Klinefelter et al. | 347/4 |
| 6,333,752 | B1 * | 12/2001 | Hasegawa et al. | 715/764 |
| 6,392,680 | B2 * | 5/2002 | Akada et al. | 347/213 |
| 6,512,594 | B1 * | 1/2003 | Lenz et al. | 358/1.16 |
| 6,692,799 | B2 * | 2/2004 | Waller, Jr. | 428/32.23 |
| 2002/0069956 | A1 * | 6/2002 | Paulson | 156/253 |

* cited by examiner

*Primary Examiner*—Scott A. Rogers

(57) ABSTRACT

The present invention is embodied in a printing system for printing identification cards with durable full-color images using an inkjet printing device. In general, the present invention provides an inkjet printing device that is used to print images on a plastic identification card. The images are printed reversibly on a transparent media. The transparent media is then laminated onto a plastic card with the side with the images being adhered to the card. As a result, the images are viewed as being printed correctly on the transparent media. Further, the images are protected on one side by the transparent media itself and on the other side by the plastic card.

18 Claims, 2 Drawing Sheets

METHOD AND SYSTEM OF PRINTING IDENTIFICATION CARD (ID) USING AN INKJET PRINTER

FIELD OF THE INVENTION

The present invention generally relates to a novel printing system for printing identification cards with durable full-color images using an inkjet printing device.

BACKGROUND OF THE INVENTION

In recent years, identification (ID) cards have become very prevalent in our society. Some examples of these cards include driver's licenses, employee identification cards, club membership cards, bond cards and insurance cards. As is well known, these cards are often carried in wallets and purses and most of them are handled numerous times over their life span. As a result, ID cards are prone to wear and tear.

Over the years, different methods have been used to produce these ID cards. For example, one method involves printing images using conventional printing equipment on heavy paper that is either pre-cut or cut thereafter into card sizes. These ID cards are very inexpensive to produce. However, due to the constant handling of these cards, they often succumb prematurely to wear and tear.

A more durable technique of producing these ID cards involves printing images on a plastic card. Plastic is sturdier than heavy paper and consequently, the ID cards thus produced are less prone to wear and tear than the heavy paper ID cards. However, the images printed on the cards have a tendency to fade away gradually with each usage. In addition, special printing equipment has to be used to print the images on the cards.

To circumvent the gradual fading of the images on the plastic and paper ID cards, the cards are sometimes laminated. For plastic cards, this can be accomplished by bonding a thin clear plastic material over the side of the cards that has the imprinted images. This is often achieved by compressing the clear plastic material onto the plastic card under heat.

One of the types of special printing equipment that is used to produce the plastic ID cards involves employing dye diffusion thermal transfer (D2T2) technology. D2T2 uses a thermal printhead to print an image on a card to allow relatively easy printing of images on plastic ID cards. However, D2T2 has several drawbacks. For example, the material used in D2T2 technology is expensive and not widely available. In addition, the thermal printhead itself is susceptible to contamination and can damage the printhead. Further, D2T2 printers are not capable of producing high quality photo images because the inks they use do not mix well enough together to produce a high gamut of colors.

Consequently, what is needed is a method of printing ID cards that is relatively inexpensive and widely available and that offers a wide array of colors for producing ID cards with high quality images.

SUMMARY OF THE INVENTION

To overcome the limitations in the prior art described above, and to overcome other limitations that will become apparent upon reading and understanding the present specification, the present invention is embodied in a printing system for printing identification cards with durable full-color images using inkjet printing technology.

In general, the present invention provides an inkjet printer that is used to print images on a plastic ID card. The images are processed by a host computer and translated and transposed to form mirror images (reverse images). The reverse images are printed on suitable transparent media, such as specially coated polyester media, preferably in roll form. The transparent media is then laminated onto a plastic card. The side with the printed images is then adhered to the card.

As a result, the images are viewed as being printed correctly on the transparent media. Further, the images are protected on one side by the transparent media itself and on the other side by the plastic card. Consequently, the images are fairly durable. The edges of the transparent media can be cut automatically so that they are flush with the edge of the plastic card. The card is then ejected to an output area, and is ready to use.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

GENERAL OVERVIEW

Figure 1:
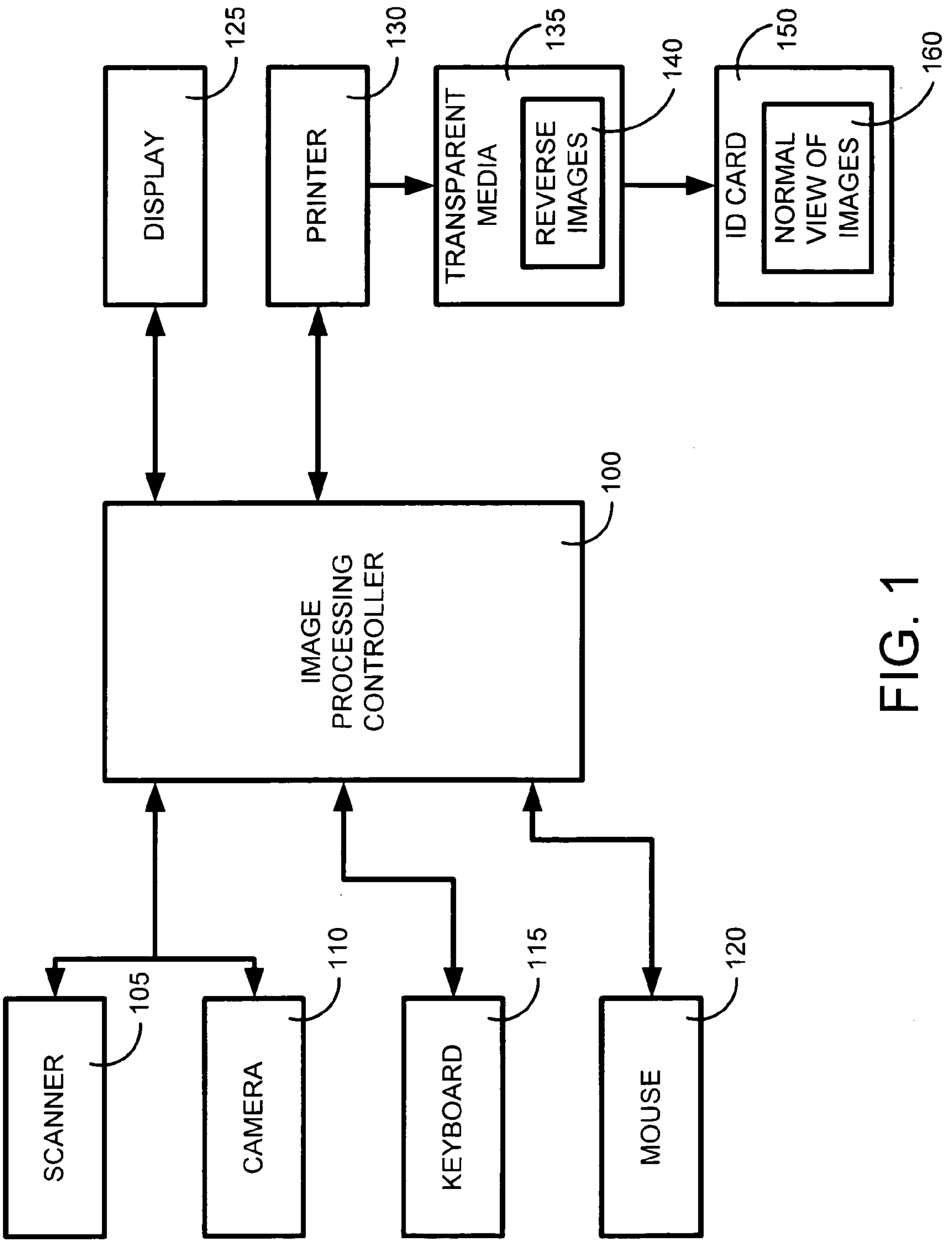
FIG. 1 depicts a block diagram of an ID card issuing system of the present invention.

With reference now to the figures, FIG. 1 depicts a block diagram of an identification (ID) card printing and issuing system according to the present invention. The ID card printing and issuing system comprises an image processing controller 100 and some input and output devices. The input devices include a scanner 105, a camera 110, a keyboard 115 and a mouse 120. The output devices include a display terminal 125, and a printer 130.

The image processing controller 100 can be software driven or a processor of a personal computer, although not restricted as such, with the requisite operating system (OS) and different memory devices (i.e., random access memory (RAM), read-only-memory (ROM), as well as hard and floppy disks to store data. The memory devices are used to store device drivers for each device, the OS as well as the different application programs that may be needed. One of these application programs may be the program needed to use the personal computer as an ID card issuing system.

The scanner 105 is used to input image data such as writing, graphic or photographic data into the system. For example, the photograph of a person may be scanned into the system. The person's signature and any relevant information about the person may also be scanned into the system. Relevant information includes name, address, height, weight, date of birth, card number, expiration date of card etc.

The camera 110 may be used to take photographs of individuals as well as photographs of relevant data about the individuals. The camera may either be a digital or a non-digital camera. If it is a non-digital camera, then a digitizer is needed to convert the photographs into digital data for later use. The keyboard 115 and mouse 120 may also be used to enter the relevant information about the individual into the system. The display system 125 is used as display systems are conventionally used. For example, it may be used to see what will be printed on the ID card before the image is actually printed on the card.

The printer 130, in accordance with the present invention, is an inkjet printing device with a suitable inkjet printhead (not shown). The printhead of the inkjet printing device is used to print reverse images 140 on any suitable transparent media 135, such as a specially coated polyester media. The transparent media 135 is later laminated to a suitable material, such as a polyvinyl chloride (PVC) or Acrylonitrile-butadiene-styrene (ABS) card 150 with the side with the printed image being adhered to the card as a normal view 160. Although PVC or ABS card are preferred, cards of other material may equally be used without departing from the scope of the invention.

OPERATION

Referring back to FIG. 1, in operation, in general, the images are processed by a host computer or the printer 130 and translated and transposed to form mirror images 140 (reverse images). Transparent media 135, such as specially coated polyester media, preferably as a roll, is located in a supply area of the printer 130 and mechanically picked up and moved toward a print zone. At the proper time, the inkjet printing device 130 starts printing a reverse image 140 on the transparent media 135. The transparent media 135 can be specially coated with any suitable material to absorb and control the amount of ink spread to allow the dispensed ink to remain on the transparent media 135.

Specifically, the printer 130 responds to commands from the image processing controller 100 of FIG. 1 and software drivers by printing reverse full color or black print images 140 on the transparent media 135. The transparent media 135 can be mechanically retrieved from a medium holding area as pre cut sheets or can be dispensed from a roll (not shown). It should be noted that the printhead can be moving and the media 135 can be stationary so that the printhead is moving both axes or vice versa.

After being printed on, the transparent media 135 can be held temporarily in an output area to allow the ink to dry. A hot air dryer can be used to speed up the drying process (not shown). Once the reverse printed image 140 on the transparent media 135 has dried, it can be laminated on a standard plastic card 150 with the side with the images being adhered.

The edges of the transparent media 135 can be cut so that they are flush with the edge of the plastic card 150. The card 150 is then ejected to an output area, and is ready to use. As a result, the images 160 are viewed as being printed correctly on the transparent media 135. Further, the images 160 are protected on one side by the transparent media 135 itself and on the other side by the plastic card 150. Consequently, the produced ID card is a fairly durable.

It should be noted that the card 150 could be coated with a pressure sensitive adhesive commonly available. The adhesive could be in the form of a transfer tape or a double-sided tape. The coating can act as an ink receptor and adhesive. The excess transparent media or adhesive tape (if used) could be removed using a die cut process.

The above described process could occur automatically. That is, the printer itself could contain a supply of standard plastic cards that could be pre-coated with the adhesive or the adhesive can be put on the card while in the printer. In one embodiment, the printer could align the printed image with the card then laminate the transparent media and the card together using the pressure sensitive adhesive tape. In addition, the excess adhesive and transparent media may be removed by a die cut process contained in the printer itself.

Figure 2:
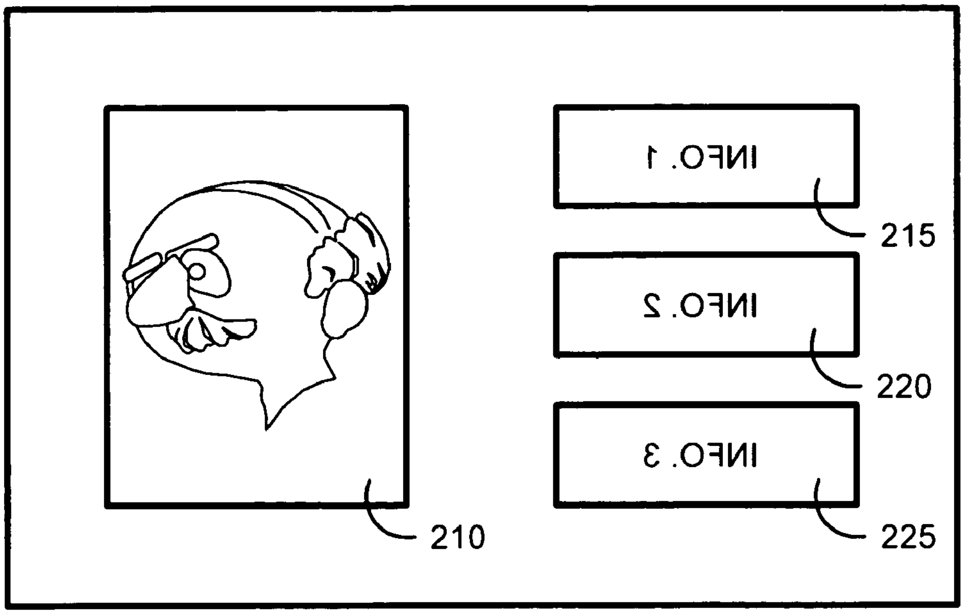
FIG. 2 illustrates a reverse printed image.
Figure 3:
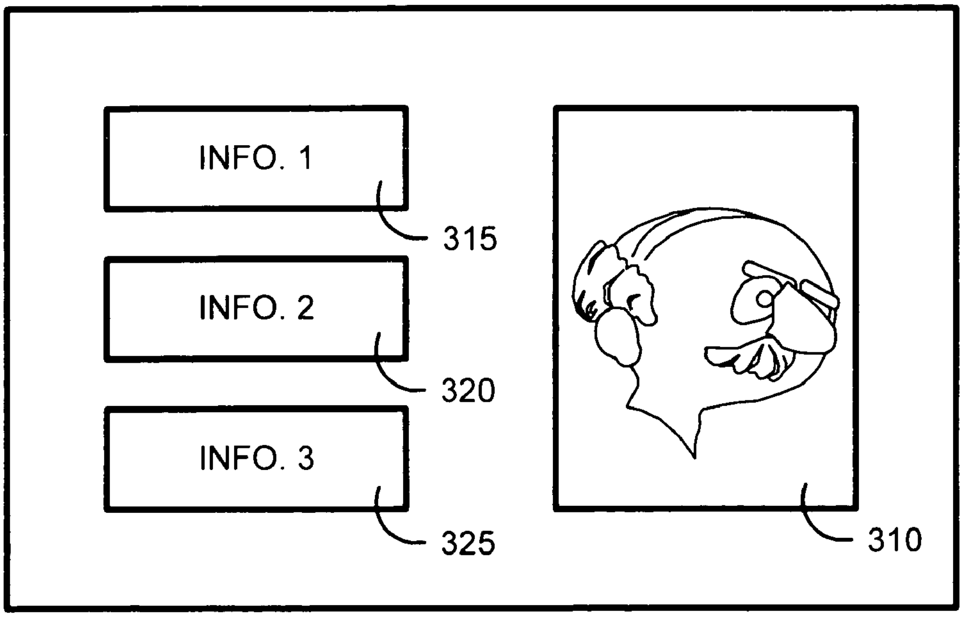
FIG. 3 depicts a mirror image of the reversibly printed image of FIG. 2.

FIGS. 2 and 3 illustrate a reverse printed image and the image, respectively. FIG. 2 represents the image 210 as printed by the printer 130 on the transparent media 135 of FIG. 1. As can be seen, FIG. 2 is the mirror image of FIG. 3. Hence, when FIG. 2 is laminated on the plastic card 150 of FIG. 1 with the side having the printed image being adhered to the card, it becomes FIG. 3.

In FIGS. 2 and 3, photo image 210 and 310 is the photo of the individual to whom the card will be issued. Info1 (215 and 315) may be the individual's address. Info2 (220 and 320) may be the individual's date of birth and Info3 (225 and 325) may be the individual's ID number.

CONCLUSION

The present invention uses an inkjet printing device to print images on ID cards. Normally, inkjet printed images are not too durable. The images are usually susceptible to damage due to scratches, contact with water, high heat, humidity etc. However according to the present invention, the images are protected on one side by the transparencies and on the other side by the plastic card. Consequently, ID card images of the present invention are relatively very durable.

In addition, inkjet printing is relatively inexpensive and also allow ink mixture to produce a huge array of different colors. Hence, ID cards produced in accordance with the present invention are relatively inexpensive and images, such as photographs of individuals, appear more realistic as the colors are closer to real life colors.

The foregoing has described the principles, preferred embodiments and modes of operation of the present invention. However, the invention should not be construed as being limited to the particular embodiments discussed. As an example, the above-described inventions can be used in conjunction with any inkjet printer. Thus, the above-described embodiments should be regarded as illustrative rather than restrictive, and it should be appreciated that variations may be made in those embodiments by workers skilled in the art without departing from the scope of the present invention as defined by the following claims.

The invention claimed is:

1. An inkjet printing device for printing identification cards, comprising:

an input area for holding transparent media;

a processor configured to receive input images that define the identification card and to translate and transpose the input images into reverse images; and an inkjet printhead coupled to the processor and configured to receive and print the reverse images on portions of the transparent media, wherein each printed portion of the transparent media is laminated to a plastic card, the side of the transparent media containing the images being adhered to the card.

2. The inkjet printing device of claim 1, wherein the transparent media is a roll of polyester media.

3. The inkjet printing device of claim 2, wherein the transparent media is coated with a material to absorb and control the amount of ink spread to allow the dispensed ink to remain on the transparent media.

4. The inkjet printing device of claim 1, wherein an adhesive tape is used to laminate the transparent media to the card.

5. The inkjet printing device of claim 4, wherein the images include a photographic image as well as alphanumerical data of an individual.

6. The inkjet printing device of claim 5, wherein the laminated plastic card is automatically cut by the printing device as an identification card.

7. The inkjet printing device of claim 6, further comprising a hot air dryer to dry the images on the transparent media before the transparent media is laminated to the plastic card.

8. The inkjet printing device of claim 7, wherein the transparent media is automatically laminated to the plastic card.

9. The inkjet printing device of claim 8, further comprising a die cut to automatically cut the laminated plastic card into the identification card.

10. A method of producing an identification card using a processor of a host computer coupled to an inkjet printhead of an inkjet printing device comprising:

creating a digital file on the host computer having images and text;

translating and transposing, with the processor, the images and the text to define reversed data;

sending the reversed data to an inkjet printhead to be printed by the inkjet printing device that includes an input area for holding transparent media;

printing the reversed data on a portion of the transparent media with the inkjet printhead; and laminating the transparent media to a plastic card, the side of the transparent media containing the images being adhered to the card.

11. The method of claim 10, wherein the transparent media is a roll of polyester media.

12. The method of claim 11, wherein the polyester roll is coated with a material to absorb and control the amount of ink spread to allow the dispensed ink to remain on the portion of the polyester media.

13. The method of claim 12, wherein each polyester roll is laminated to a plastic card, the side of the polyester media containing the images being adhered to the card.

14. The method of claim 13, wherein an adhesive tape is used to laminate the polyester media to the card.

15. The method of claim 14, further comprising cutting the laminated plastic card is into an identification card.

16. The method of claim 15, further comprising drying with hot air the images on the polyester media before the polyester media is laminated to the plastic card.

17. The method of claim 16, wherein the polyester media is automatically laminated to the plastic card.

18. The method of claim 17, further comprising automatically cutting the laminated plastic card into the identification card.

* * * * *